Sept. 6, 1938.  F. C. WAPPLER  2,129,390
DIAGNOSTIC INSTRUMENT
Filed April 9, 1936
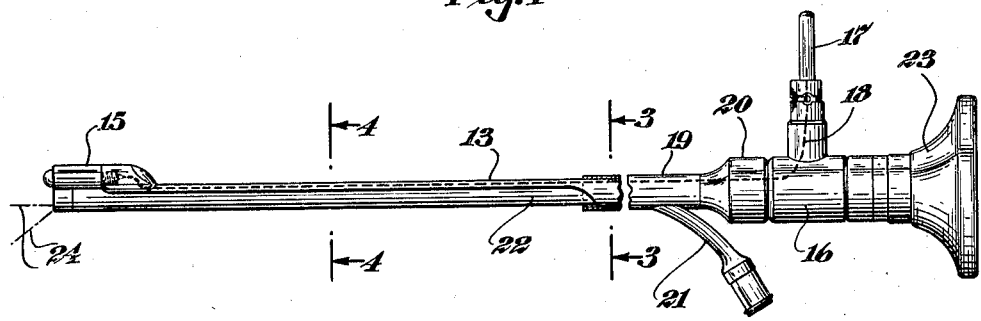
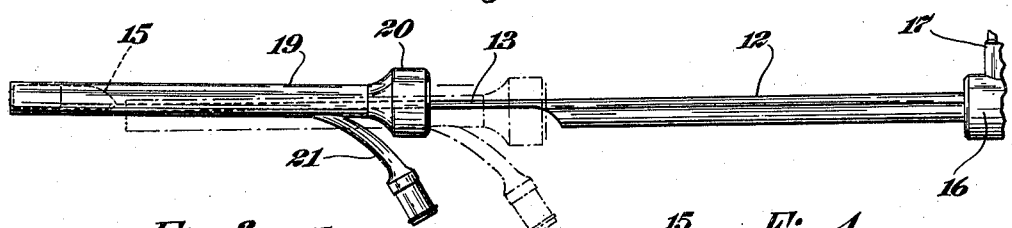
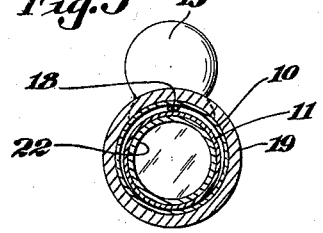
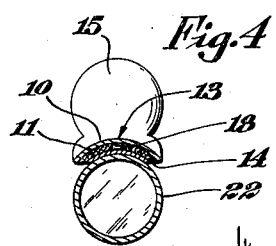
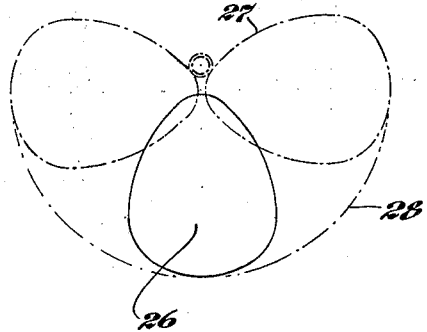
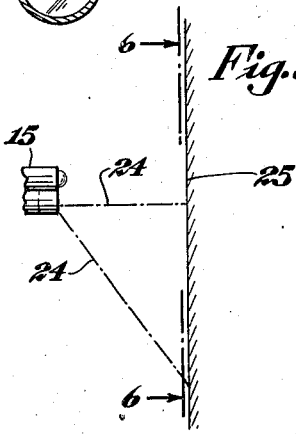
INVENTOR,
Frederick Charles Wappler,
BY Frederick Breitenfeld
ATTORNEY.

Patented Sept. 6, 1938

2,129,390

UNITED STATES PATENT OFFICE 2,129,390

DIAGNOSTIC INSTRUMENT

Frederick Charles Wappler, New York, N. Y.

Application April 9, 1936, Serial No. 73,440

3 Claims. (Cl. 128—7)

My present invention relates generally to surgical instruments, and has particular reference to a diagnostic instrument for internal examinations.

A general object of the invention is to provide an instrument of simplified structural nature and adapted to afford enhanced visibility of internal body cavities.

One of the characterizing features of the present construction lies in the provision of means for permitting the employment, in combination, of a telescope commanding a forwardly oblique field of vision, and a lamp arranged adjacent to the objective of the telescope for illuminating the field. More particularly, I provide an improved means for mounting the lamp in association with the telescope so that the latter may be rotated and longitudinally shifted independent of the lamp.

In a preferred embodiment of the invention, the lamp is mounted eccentrically upon the forward end of a tubular lamp carrier which is adapted slidably and rotatably to accommodate the telescope tube therein. The tubular lamp carrier has its forward portion in the form of a fin which is formed by cutting away all but one segmental wall portion of the lamp carrier. This construction is designed to permit the lamp carrier to be inserted and removed longitudinally through a sheath which snugly fits around the lamp carrier. If the latter had a circular cross-section throughout its entire length it would not be possible to insert it through a sheath of this kind, by virtue of the fact that the lamp at the forward end of the lamp carrier is eccentrically mounted.

A particular feature of the present structure lies in the formation of the lamp carrier by means of two snugly nesting tubes, the parts defining the segmental wall portion being bonded together by a layer of bonding material such as solder. The entire structure is thus rigidified and strengthened, and the electrical connection for the lamp, usually in the form of an insulated conducting wire, is caused to extend through a longitudinal passage in the layer of bonding material.

The present association of parts affords an unusually large field of illuminated vision which is unaffected and unimpaired by the lamp which affords the illumination.

I achieve the foregoing objects, and such other objects as may hereinafter appear or be pointed out, in the manner illustratively exemplified in the accompanying drawing, wherein—

Figure 1 is a side view of an instrument constructed in accordance with my present invention;

Figure 2 is a similar view, showing the manner in which the sheath is fitted over the lamp carrier during the assembly of the instrument;

Figure 3 is an enlarged cross-sectional view taken substantially along the line 3—3 of Figure 1;

Figure 4 is an enlarged cross-sectional view taken substantially along the line 4—4 of Figure 1;

Figure 5 is a view of the forward end of the instrument, indicating its field of vision; and Figure 6 is a diagrammatic view, taken substantially along the line 6—6 of Figure 5, and showing the relatively large range of visibility.

The present tubular lamp carrier is formed of the two nesting tubes 10 and 11 which are firmly bonded together to form an integral element having a rear portion 12 of substantially circular cross-section and a forward portion 13 of fin-like nature. The forward portion extends for approximately half the length of the entire lamp carrier and is formed by cutting away all but one segmental wall portion of the carrier, as indicated most clearly in Figure 4.

In the latter figure, I have shown the manner in which the forward parts of the tubes 10 and 11 are bonded together by a layer of solder or the like 14.

At the forward end of the lamp carrier I mount a lamp 15 in an eccentric relation to the axis of the lamp carrier. At its rear end, the lamp carrier is provided with the bored sleeve-like member 16 to which an electric binding post 17 is connected. A conducting wire 18 extends in insulated relationship from the terminal 17 to the lamp 15, and this wire extends through a longitudinal passage provided in the layer of solder 14, as indicated most clearly in Figure 4. To provide this passage, during the time that the forward parts of the tubes 10 and 11 are soldered or otherwise bonded together, I position a tungsten wire between these parts during the soldering operation. The solder does not bond itself to tungsten, and, therefore, after it has hardened, it is a relatively simple matter to withdraw the tungsten wire longitudinally. This forms the passageway through which the insulated conducting wire for the lamp may be threaded. This procedure takes place during the manufacture of the device.

A sheath 19, approximately half the length of the lamp carrier, is adapted to fit snugly around the lamp carrier when the instrument is in use, as shown most clearly in Figure 1. The manner in which the sheath is applied is indicated in Figure 2. The lamp 15 has a cross-sectional area no greater than the body of the lamp carrier, and the sheath may readily pass over the lamp and over the fin-like portion of the lamp carrier, as shown in Figure 2. As soon as the lamp 15 has passed through the sheath, it is enabled to position itself eccentrically with respect to the sheath, and the latter may then be readily slipped over the rear half of the lamp carrier. The sheath preferably has a flaring rear end 20 which is adapted to abut against the sleeve-like member 16 mounted on the rear end of the lamp carrier. The sheath is also preferably provided with a rearwardly directed irrigation tube 21.

The construction is completed by the insertion, from the rear, through the lamp carrier, of the telescope tube 22. The latter is adapted to fit snugly, yet slidably and rotatably, within the lamp carrier. It carries the usual eyepiece 23 at the rear end and is of a length which brings the forward end of the telescope tube alongside of the lamp 15 when the telescope is fully inserted.

At the forward end of the tube 22, the telescope is provided with an eccentric objective lens, substantially of the character illustrated and described in United States Letters Patent No. 1,680,491, this lens being adapted to command a forwardly oblique field of vision. This field is substantially conical, as indicated by the dot-and-dash lines 24, and it will be observed that the apex of the cone passes into a side portion of the objective lens. The term "forwardly oblique", as it is used herein and in the appended claims, in referring to the field of vision of the telescope, is intended in each case to designate a substantially conical field of the character hereinbefore described.

For illustrative purposes, I have shown in Figure 5 a wall or area 25 which may be assumed to represent the region which is to be examined or inspected by the use of the instrument. The instrument is advanced toward the wall, as indicated in Figure 5; the wall is efficiently illuminated by the lamp; and the telescope enables the operator to command an unimpeded view of a substantially oval area 26. This is by no means the limit of visibility of the device, because, by merely rotating the telescope tube relative to the lamp, i. e., rotating it around the telescope axis, the oval field shifts through a circular arc.

The area 26 of Figure 6 represents the field of vision when the telescope is so positioned that the apex of the conical field of vision is furthest removed from the lamp 15. As the telescope is rotated about its axis in one or the other direction, the periphery of the field shifts along the circular arc 28. Each of the areas 27 represents the field of vision when the telescope has been rotated to a point where the lamp just commences to infringe upon the field. Even when the telescope is rotated further, i. e., into a position in which the axis of the conical field is inclined directly toward the lamp 15, the lamp does not infringe to any material extent upon the field; but in order to avoid having the lamp interfere in any way with the view which is obtained through the telescope, it is preferable to rotate the entire instrument, lamp and all, when it is desired to inspect the region beyond the limits of the dot-and-dash areas 27.

One of the outstanding advantages of the present construction lies in the fact that the instrument may be advanced, as closely as may be desired, toward the area which is being inspected. For example, in Figure 5, the instrument may be advanced all the way up to the wall 25, the advancing movement being terminated only by the abutment of the instrument itself with the wall 25. An unusually close view may thus be obtained of the areas which are being examined. Such a view of an area under observation, unimpaired by the lamp itself or other portions of an instrument, has never heretofore, to my knowledge, been successfully accomplished.

Obviously, by withdrawing the instrument from the area being inspected, the field of vision becomes enlarged porportionately, and the operator is enabled to obtain an excellent "perspective" of the entire region. The present instrument is particularly advantageous in this respect, because the operator may, if he desires, leave the lamp in contact with, or closely adjacent to, the area to be inspected; and may merely withdraw or retract the telescope relative to the lamp. Unusually effective visibility is obtained in this way, because the lamp affords a high illumination of the area, while it nevertheless remains itself outside of the field of vision. The details of the illuminated area show up with remarkable clearness, even in close proximity to the lamp itself, this result being unattainable where the lamp encroaches upon the field of vision and by its glare beclouds the area adjacent to it.

The highly desirable range of visibility which my instrument affords is the direct result of the association, with a telescope commanding a forwardly oblique field of vision, of a lamp mounted alongside of the objective independently of the telescope, thereby permitting rotational and longitudinal movements of the telescope relative to the lamp.

In general, it will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative, and not in a limiting sense.

Having thus described my invention, and illustrated its use, what I claim as new and desire to secure by Letter Patent is—

1. In a diagnostic instrument of the character described, an elongated cylindrical telescope tube having at its forward end an objective commanding a forwardly oblique field of vision, a tubular lamp carrier slidably and rotatably accommodating said telescope tube therein, a lamp eccentrically mounted on the forward end of the lamp carrier, and a sheath about half as long as the lamp carrier and adapted snugly to accommodate said lamp carrier therein, the forward half of the lamp carrier having all but one segmental wall portion cut away to permit insertion and removal of the lamp carrier through said sheath.

2. A lamp carrier of the character described, comprising a tubular member, a lamp eccentrically mounted on the forward end thereof, the forward half of said member having all but one segmental wall portion cut away; said member being formed of two nested tubes having the parts defining said segmental wall portion bonded together by a layer of bonding material, said layer having a longitudinal passage therethrough, and an insulated conducting wire for said lamp extending through said passage.

3. In a diagnostic instrument of the character described, an elongated cylindrical telescope tube having at its forward end an objective commanding a forwardly oblique field of vision, a tubular lamp carrier slidably and rotatably accommodating said telescope tube therein, a lamp eccentrically mounted on the forward end of the lamp carrier, and a sheath shorter than the lamp carrier and adapted snugly to accommodate said lamp carrier therein, the forward portion of the lamp carrier having all but one segmental wall portion cut away to permit insertion and removal of the lamp carrier through said sheath, and the sheath having a length no greater than said forward portion of the lamp carrier.

FREDERICK CHARLES WAPPLER.